(12) United States Patent
Nandagopal et al.

(10) Patent No.: US 11,028,784 B2
(45) Date of Patent: Jun. 8, 2021

(54) METHODS AND SYSTEMS FOR HEAVY FUEL OIL IN GAS TURBINES

(71) Applicant: General Electric Company, Schenectady, NY (US)

(72) Inventors: Pugalenthi Nandagopal, Bangalore (IN); Vikram Muralidharan, Hyderabad (IN); Veerappan Muthaiah, Bangalore (IN); Harold Jordan, Jr., Greenville, SC (US); Maher Mohamad Aboujaib, Belfort (FR); Matthieu Paul Frederic Vierling, Belfort (FR); Sanyu Victoria Nakibuuka Njuki, Belfort (FR); Pierre Montagne, Belfort (FR); Sven Sébastien Catrin, Belfort (FR); Ezio M. Pena Saavedra, Belfort (FR); Laurent Balcer, Belfort (FR); Dmitry Sokolov, Belfort (FR)

(73) Assignee: General Electric Company, Schenectady, NY (US)

(*) Notice: Subject to any disclaimer, the term of this patent is extended or adjusted under 35 U.S.C. 154(b) by 265 days.

(21) Appl. No.: 16/133,780

(22) Filed: Sep. 18, 2018

(65) Prior Publication Data
US 2020/0088110 A1 Mar. 19, 2020

(51) Int. Cl.
*F02C 9/40* (2006.01)
*F02C 9/28* (2006.01)
*F02C 9/26* (2006.01)

(52) U.S. Cl.
CPC .............. *F02C 9/40* (2013.01); *F02C 9/26* (2013.01); *F02C 9/28* (2013.01); *F05D 2270/54* (2013.01)

(58) Field of Classification Search
CPC .............. F02C 9/40; F02C 9/28; F02C 9/26
See application file for complete search history.

(56) References Cited

U.S. PATENT DOCUMENTS

| | | | |
|---|---|---|---|
| 5,561,977 A * | 10/1996 | Harada | C10L 1/10 60/779 |
| 6,116,016 A * | 9/2000 | Wada | C10L 1/12 60/39.17 |
| 7,435,330 B2 | 10/2008 | Hokari et al. | |
| 9,243,564 B2 | 1/2016 | Scipio et al. | |
| 9,556,393 B2 | 1/2017 | Moliere | |
| 2005/0150205 A1* | 7/2005 | Dixon | C10L 9/08 60/39.281 |

(Continued)

*Primary Examiner* — Steven M Sutherland
(74) *Attorney, Agent, or Firm* — Fletcher Yoder, P.C.

(57) ABSTRACT

A control system for a gas turbine includes a controller. The controller includes a processor configured to receive a plurality of signals from sensors disposed in the gas turbine engine system, wherein the gas turbine system engine comprises a compressor section fluidly coupled to a gas turbine section. The processor is additionally configured to derive a vanadium content in a gas turbine engine fuel based on at least one of the plurality of signals. The processor is also configured to determine if a control curve should be adjusted based on the vanadium content in the gas turbine engine fuel, and if it is determined that the control curve should be adjusted, then deriving an adjustment to the control curve based on the vanadium content, and applying the adjustment to the control curve to derive an adjusted control curve.

17 Claims, 4 Drawing Sheets

(56) References Cited

U.S. PATENT DOCUMENTS

| | | | |
|---|---|---|---|
| 2010/0242490 A1* | 9/2010 | Symonds | F02C 3/305 |
| | | | 60/775 |
| 2012/0102966 A1* | 5/2012 | Haruyama | F02C 9/40 |
| | | | 60/772 |
| 2015/0267620 A1* | 9/2015 | Rizkalla | F02C 9/48 |
| | | | 701/100 |
| 2017/0159576 A1* | 6/2017 | Kraft | F02C 9/00 |

* cited by examiner

METHODS AND SYSTEMS FOR HEAVY FUEL OIL IN GAS TURBINES

BACKGROUND

The subject matter disclosed herein relates to gas turbines, and more particularly, to methods and systems for heavy fuel oils in gas turbines.

Gas turbine systems typically include a compressor for compressing a working fluid, such as air, which is then combined with a fuel, such as a hydrocarbon-based fuel, and then combusted. For example, the compressed air and fuel are injected into a combustor which heats the combustion fluid causing it to expand, and the expanded fluid is forced through a turbine, causing components of the turbine to rotate. Rotations of the turbine components produce mechanical power, which may then be used to drive a load, such as an electric generator. It may be beneficial to improve the use of heavy fuel oils in gas turbine engines.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a control system includes a controller. The controller includes a processor configured to receive a plurality of signals from sensors disposed in the gas turbine engine system, wherein the gas turbine system engine comprises a compressor section fluidly coupled to a gas turbine section. The processor is additionally configured to derive a vanadium content in a gas turbine engine fuel based on at least one of the plurality of signals. The processor is also configured to determine if a control curve should be adjusted based on the vanadium content in the gas turbine engine fuel, and if it is determined that the control curve should be adjusted, then deriving an adjustment to the control curve based on the vanadium content, and applying the adjustment to the control curve to derive an adjusted control curve.

In a second embodiment, a method includes receiving a plurality of signals from sensors disposed in the gas turbine engine system, wherein the gas turbine system engine comprises a compressor section fluidly coupled to a gas turbine section. The method also includes deriving a vanadium content in a gas turbine engine fuel based on at least one of the plurality of signals. The method further includes determining if a control curve should be adjusted based on the vanadium content in the gas turbine engine fuel; and if it is determined that the control curve should be adjusted, then deriving an adjustment to the control curve based on the vanadium content, and applying the adjustment to the control curve to derive an adjusted control curve.

A third embodiment includes a non-transitory computer-readable medium having computer executable code stored thereon, the code having instructions to receive a plurality of signals from sensors disposed in the gas turbine engine system, wherein the gas turbine system engine comprises a compressor section fluidly coupled to a gas turbine section. The code also includes instructions to derive a vanadium content in a gas turbine engine fuel based on at least one of the plurality of signals. The code further includes instructions to determine if a control curve should be adjusted based on the vanadium content in the gas turbine engine fuel; and if it is determined that the control curve should be adjusted, then deriving an adjustment to the control curve based on the vanadium content, and applying the adjustment to the control curve to derive an adjusted control curve.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
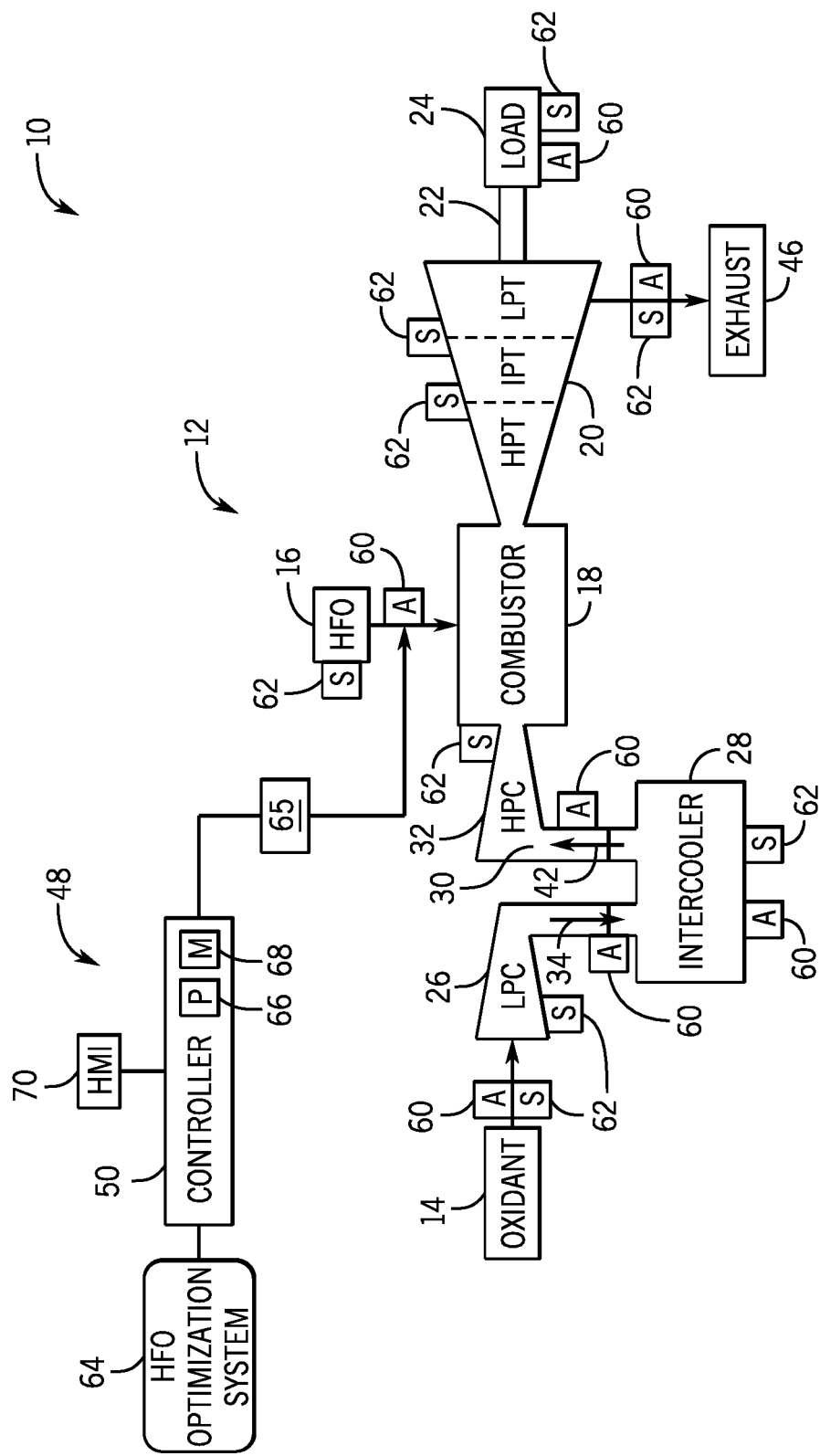
FIG. 1 is a schematic diagram of an embodiment of a power generation system having a heavy fuel oil (HFO) control system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed towards a system and method to control a gas turbine system that may be operating on a heavy fuel oil (HFO), and more specifically, that may be operating on a gas turbine fuel that contains vanadium. Certain HFOs may include concentrations of vanadium metal present, for example, in an oil-soluble form. Vanadium may not be desired in the fuel because it may lead to fouling and/or to corrosion. For example, vanadium may react with oxygen to form vanadium pentoxide, which in turn may lead to ash deposition in certain components of a gas turbine engine, such as hot gas path components. Ash deposition may result in decreased performance and/or efficiency, and may lead to more frequent maintenance scheduling of, for example, offline water washes of the gas turbine engine. During offline water washes the gas turbine system is shut down, hence increasing an amount of downtime and reducing power production.

The techniques described herein may enable the use of fuel that contains vanadium by adjusting firing temperatures for the gas turbine system via a control system. In certain embodiments, temperature control curves used in the control system may be adjusted dynamically based on sensing of vanadium content in a fuel. For example, sensors of the control system may sense vanadium content and the control system may then adjust firing temperatures to enable for a more efficient use of vanadium in fuels, such as in HFOs, as further described below. Further, the techniques described herein may derive an amount of a vanadium inhibitor, such as magnesium and/or magnesium-containing formulations, to be mixed with the fuel also based on the sensed vanadium content. The addition of the vanadium inhibitor may then be used to further adjust the temperature control curves, thus resulting in a combustion of the HFO that may reduce ash deposition and lead to more efficient power generation.

It may be beneficial to describe turbine systems that may burn carbonaceous fuels, including HFOs. Accordingly, and now turning to the figures, FIG. 1 is a schematic diagram of an embodiment of a power generation system 10 that includes a gas turbine system 12. It is to be noted that the described gas turbine system 12 is but one example of various types of gas turbine that may be used with the techniques described herein to use HFOs during operation. In the depicted example, the gas turbine system 12 may receive an oxidant 14 (e.g., air, oxygen, oxygen-enriched air, or oxygen-reduced air) and a fuel 16 (e.g., gaseous or liquid fuel), such as hydrocarbon-based fuels, including heavy fuel oils (HFOs), natural gas, syngas, and the like. The oxidant 14 may be pressurized and combined with the fuel 16 to be combusted in a combustor section 18. A combusted fluid may then be used to apply forces to blades of a turbine section 20 to rotate a shaft 22 that provides power to a load 24 (e.g., electric generator).

The gas turbine system 12 may include a compressor section 25 having at least one compressor suitable for increasing the pressure of the oxidant 14. As depicted in FIG. 1, the compressor section 25 includes a lower pressure compressor (LPC) 26 connected to an intercooler 28 to couple the lower pressure compressor 26 to an inlet 30 of a high pressure compressor (HPC) 32. The oxidant 14 enters the low pressure compressor 26 and is compressed into a compressed oxidant 34 (e.g., gas, liquid, or both). The compressed oxidant 34 may include a compressed gas (e.g., air, oxygen, oxygen-enriched air, or oxygen-reduced air), a lubricant (e.g., oil), a coolant fluid, or any combination thereof. In certain embodiments, the compressed oxidant 34 may include gas from exhaust gas recirculation (EGR). The compressed oxidant 34 then enters the intercooler 28. It is to be noted that, in some embodiments of the system 10, no intercooler 28 is used and/or a single compressor is used in the compressor section 25.

The intercooler 28 may be any intercooler 28 suitable for cooling the compressed oxidant 34, such as a spray intercooler. The intercooler 28 may cool the compressed oxidant 34 by using a fluid to increase the efficiency of the gas turbine system 12. The compressed and cooled oxidant 42 is further compressed in the high pressure compressor 32 and combined with the fuel 16 into an oxidant-fuel mixture to be combusted in the combustor 18. As the oxidant-fuel mixture (e.g., HFO) is combusted (e.g., burned and/or ignited), the oxidant-fuel mixture expands through one or more turbines 20. For example, embodiments may include a high pressure turbine (HPT), intermediate pressure turbine (IPT), and a low pressure turbine (LPT) as depicted in FIG. 1. In some embodiments, the system 10 may include HPT and LPT turbines. In other embodiments, there may be a single turbine, four, five, or more turbines.

The turbine 20 may be coupled to a shaft 22 that is coupled to one or more loads 24. The turbine 20 may include one or more turbine blades that rotate causing the shaft 22 to provide rotational energy to the load 24. For example, the load 24 may include an electrical generator or a mechanical device in an industrial facility or power plant. The rotational energy of the shaft 22 may be used by the load 24 to generate electrical power. As the gas turbine system 12 generates power, the combusted oxidant-fuel mixture is expelled as an exhaust 46. The exhaust 46 may include one or more emissions, such as nitrogen oxides ($NO_X$), hydrocarbons (HC), carbon monoxide (CO) and/or other pollutants. The exhaust 46 may be treated in a variety of ways, such as with a catalyst system.

The power generation system 10 may also include a control system 48 to monitor and/or control various aspects of the gas turbine system 12, fuel 16 delivery, the load 24, and/or the intercooler 28 (when the intercooler 28 is included). The control system 48 may include a controller 50 having inputs and/or outputs to receive and/or transmit signals to one or more actuators 60, sensors 62, or other controls to control the gas turbine system 12. While some examples are illustrated in FIG. 1 and described below, these are merely examples and any suitable sensors and/or signals may be positioned on the gas turbine system 12, the load 24, and/or the intercooler 28 to detect operational parameters to control the power generation system 10 with the controller 50. For example, the controller 50 may send and/or receive a signal from one or more actuators 60 and sensors 62 to control any number of aspects of the system 10, including fuel supply, speed, oxidant delivery, power production, and so forth. For example, actuators 60 may include valves, positioners, pumps, and the like. The sensors 62 may sense temperature, pressure, speed, clearances (e.g., distance between a stationary and a moving component), flows, mass flows, and the like.

Further, the controller 50 may include and/or communicate with a heavy fuel oil (HFO) optimization system 64. The HFO optimization system 64 may first set up a control curve, such as a turbine engine 12 firing temperature control curve (Tfire), to use when operating the turbine engine 12. More specifically, a vanadium content of the fuel may be sensed and the HFO optimization system 64 may then select or derive a Tfire control curve to be used with the amount of vanadium sensed in the fuel 16, such as vanadium sensed in HFO used as the fuel 16. In other embodiments, in addition to or alternative to selecting the Tfire control curve to use, the HFO optimization system 64 may continuously adjust the Tfire control curve based on continuous measurements of vanadium content in the fuel 16, as further described below.

In certain embodiments, the HFO optimization system 64 may also include or be communicatively coupled with an additive system 65 that supplies a vanadium inhibitor such as a magnesium (Mg) based additive suitable for mitigating or eliminating deleterious effects of vanadium. For example, the HFO optimization system 64 may add the additive via the additive system 65 based on sensed vanadium content in the fuel, based on the type of fuel 16 used, and so on. In embodiments that use the additive system 65, the HFO optimization system 64 may also set up or derive a Tfire control curve based on the amount of the additive 65, the vanadium content in the fuel 16, or a combination thereof. The HFO optimization system 64 may additionally or alternatively adjust the Tfire control curve based on continuous measurements of vanadium content in the fuel 16, as further described below. The HFO optimization system 64 and the additive system 65 may be a software system, a hardware system, or a combination thereof. Further, the HFO optimization system 64 and the additive system 65 may be included in the controller 50, or may be communicatively coupled to the controller 50.

The controller 50 may include a processor 66 or multiple processors, memory 68, and inputs and/or outputs to send and/or receive signals from the one or more sensors 62 and/or actuators 60. The processor 66 may be operatively coupled to the memory 68 to execute instructions for carrying out the presently disclosed techniques. These instructions may be encoded in programs or code stored in a tangible non-transitory computer-readable medium, such as the memory 68 and/or other storage. The processor 66 may be a general purpose processor, system-on-chip (SoC) device, or application-specific integrated circuit, or some other processor configuration. For example, the processor 66 may be part of an engine control unit that controls various aspects of the turbine system 12.

Memory 68 may include a computer readable medium, such as, without limitation, a hard disk drive, a solid state drive, a diskette, a flash drive, a compact disc, a digital video disc, random access memory (RAM), and/or any suitable storage device that enables processor 66 to store, retrieve, and/or execute instructions and/or data. Memory 68 may further include one or more local and/or remote storage devices. Further, the controller 50 may be operably connected to a human machine interface (HMI) 70 to allow an operator to read measurements, perform analysis, and/or adjust set points of operation.

Figure 2:
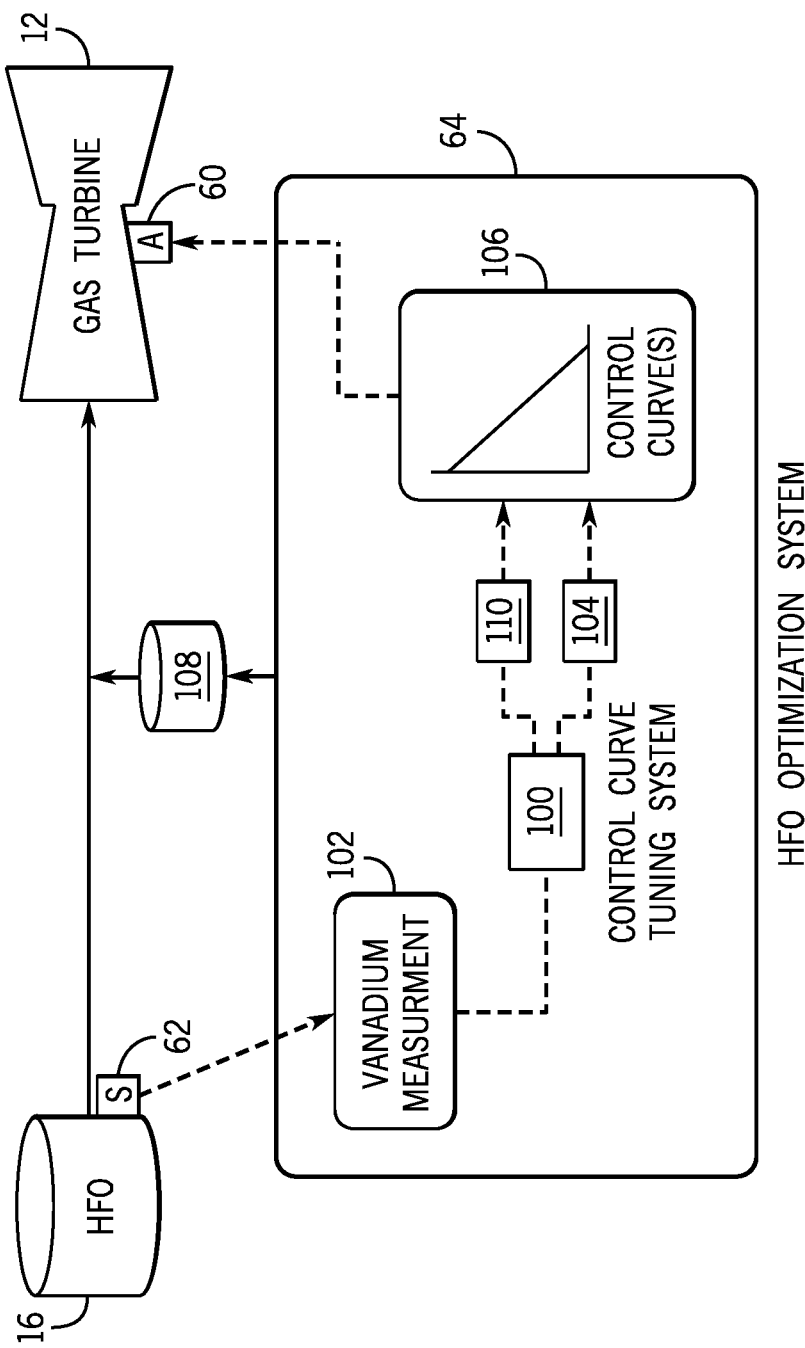
FIG. 2 is a block diagram of an embodiment of an HFO optimization system operatively coupled to an HFO delivery system and to a gas turbine engine system included in the power generation system of FIG. 1.

Turning now to FIG. 2, the figure illustrates further details of an embodiment of the HFO optimization system 64. In the illustrated embodiment, the HFO optimization system 64 includes a control curve tuning system 100. The control curve tuning system 100 may receive a vanadium measurement 102 provided via one or more sensors 62 sensing vanadium in the HFO 16. The curve tuning system 100 may use the vanadium measurement 102 to derive an adjustment factor 104. Generally, higher vanadium content may result in adjustments that lower (e.g., derate) a firing temperature (Tfire) to be used in controlling operations of the gas turbine engine 12. A gas turbine testbed may be used, for example, to derive specific adjustment factors 104 based on the type of gas turbine engine 12 used (e.g., the model of the gas turbine engine), the type of load 24 used (e.g., model of electric generator used), drive train used, and so on.

The testbed may be used to operate with specific vanadium fuel content and based on observations of experimental and/or simulated results (e.g., wear and tear on components, "dirtiness" of components, ash deposition, and so on). derive the adjustment factors 104 suitable for adjusting one or more control curves 106. In certain embodiments, in addition to or alternative to testbed observations from a fleet of gas turbine engines 12 may be used to derive the adjustment factors 104. For example, observation during hot gas path inspection (HGPI) of components may be used to derive the adjustment factors 104. HGPI may inspect the combustion section 18, the turbine section 20 (e.g., blades, vanes), and/or the exhaust section 46. In certain embodiments, the adjustment factors 104 may be stored, for example, in a look-up table.

The adjustment factors 104 may be applied to one or more of the control curves 106 so as to derate, for example, Tfire based on vanadium content. By way of example only, the table below shows some example values to illustrate derating of Tfire for an example gas turbine engine 12. It is it to be noted that specific models of the gas turbine 12 may have specific tables, for example, provided by the gas turbine engine manufacturer. In the example generic table, for standard fuel (e.g. low or no vanadium fuels), Tfire may be between 2035° F. to 2060° F., and then Tfire may be derated values are shown in Table 1.

TABLE 1

| Vanadium Content (in PPM) versus adjusted Tfire | |
|---|---|
| Vanadium Content | Tfire |
| <20 | 2035° F. |
| 25 | 2030° F. |
| 30 | 2025° F. |
| 35 | 2020° F. |
| 40 | 2015° F. |
| 45 | 2010° F. |
| 50 | 2005° F. |

More generally, given a non-derated Tfire value, vanadium content in the fuel may be used to derate the Tfire value by a certain amount (e.g., between 0.1° F. to 150° F.), and/or by a certain percentage (e.g., between 0.1% to 20%). In certain embodiments, the control curves 106 may already include built-in adjustments. That is, a set of control curves 106 may be provided, for example, by the gas turbine engine 12 manufacturer, that already incorporate adjustments into the control curves 106 for certain vanadium content or range. The HFO optimization system may then select one or more of the control curves 106 based on the vanadium measurement. As mentioned earlier, the testbed may be used to run certain HFO 16 as fuel to observe wear and tear on components, "dirtiness" of components, ash deposition, and so on, and the observations may then be used to derive control curves 106 that are adjusted for operating with a given vanadium content in the HFO 16. Likewise, data from a HGPI (e.g., fleet data from multiple gas turbine engine systems) may be used to observe components of the gas turbine engine 12 to derive adjusted control curves 106.

As mentioned earlier, the control system 48 and/or the HFO optimization system 64 may add additive 108 via the additive system 65 to ameliorate effects of vanadium. In some embodiments, the HFO optimization system 64 may additionally derive adjustments 110 and/or the selection of the control curves 106 based on both the vanadium measurement 102 and the additive 108 (e.g., additive type, additive quantity) being used. For example, the control system 48 may provide (or the HFO optimization system 64 may derive) the quantity of the additive 108 that will be mixed with the HFO 16 during gas turbine engine 12 operations. The control curve tuning system 100 may then calculate the adjustments 110 based on both the vanadium measurement 102 as well as the additive 108 that is added to the HFO 16 for vanadium suppression. For example, the control curve tuning system 100 may derive the first adjustment 104 based on the vanadium measurement 102, and then further add to subtract from the first adjustment 104 to derive a second adjustment 110 based on the additive quantity 108. The second adjustment 110 may then be applied to the control curve(s) 106.

In certain embodiments, the HFO optimization system 64 may dynamically and continuously adjust the control curve (s) 106. For example, once a control curve 106 is selected, the HFO optimization system 64 may monitor the vanadium measurement 102 and/or the additive 108 to derive the adjustments 104 and/or 110. The monitoring and subsequent adjustments 104, 110 may be executed in real-time (e.g., every 1-100 microseconds, milliseconds), and/or in near real-time (e.g., every 1-100 seconds). Indeed, HFO 16 provided to the gas turbine engine 12 may be continuously monitored to derive the adjustments 104 and/or 110 suitable for improving gas turbine engine life and/or gas turbine engine performance By sensing vanadium content in the HFO 16 and additive content to be used during operations of the gas turbine engine 12, the HFO optimization system 64 may enable more efficient and use of the HFO 16 as well as improved maintenance scheduling for the gas turbine engine 12.

Figure 3:
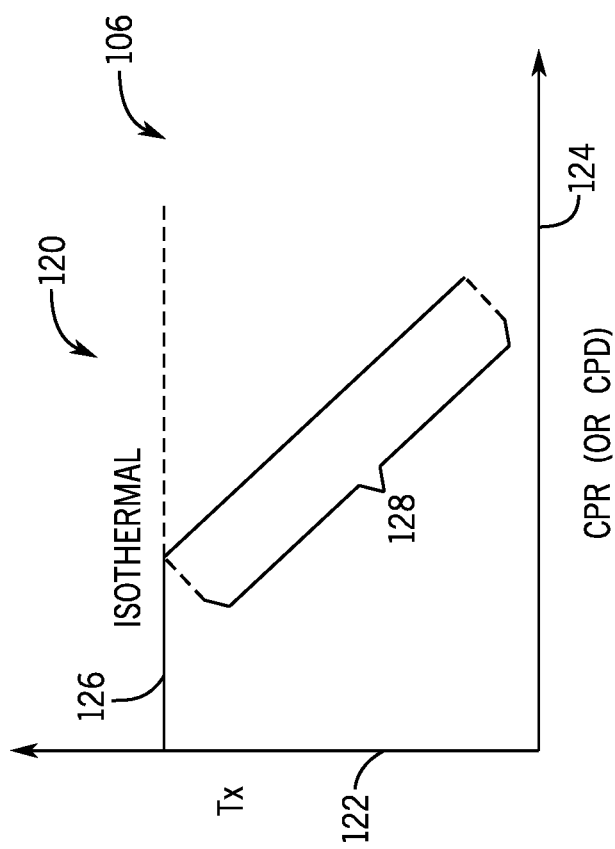
FIG. 3 is a graph of an embodiment of a control curve suitable for controlling the power generation system of FIG. 1.

It may be beneficial to describe control (e.g., temperature control) via the control curve(s) 106. Turning now to FIG. 3, the figure is a graph 120 illustrating an embodiment of the control curve 106. In the depicted embodiment, the control curve 106 may be used for a temperature control mode of operation for the gas turbine engine 12. More specifically, the control curve 106 may be used by the controller 50, for example, during operations of the gas turbine engine 12 to sense a temperature and a compressor pressure ratio (CPR), and based on the sensed temperature and CPR, to determine a fuel adjustment to control the gas turbine engine 12. In certain embodiments, CPR may be interchangeable with compressor discharge pressure (CPD) or may be derived from CPD measurements.

In the depicted example, a first axis 122 is representative of exhaust temperature (Tx) for the exhaust system 46 and a second axis 124 is representative of CPR (or CPD). The exhaust temperature Tx may be used in lieu of firing temperature (Tfire). For example, because of the high combustion temperatures present in the combustion section 18, it may be infeasible to sense Tfire directly. Accordingly, Tx may be sensed at one or more points of the exhaust system 46 and may be used to derive Tfire, thus indirectly representing Tfire. An isothermal portion 126 of the control curve 106 is also shown. The isothermal portion 126 provides for a temperature limit above which components and/or systems of the gas turbine engine 12 should not be exposed to.

A constant firing temperature portion 128 of the control curve is also shown. During operations (e.g., baseload operations), the controller 50 may sense exhaust temperature and CPR (or CPD) and then respond by adjusting fuel flow, inlet guide van angles, and so on, to bring a sensed "point" (e.g., point plotted via sensed Tx and sensed CPR [or CPD]) back onto the control curve 106. For example, during baseload operations where the gas turbine engine 12 is operating at is designed load (e.g., load designed to produce a given electrical power such as 500 megawatts), increasing HFO fuel 16 intake will likely increase temperature, and vice versa. The controller 50 may also actuate inlet guide vanes, for example, to increase or decrease intake of oxidant (e.g., air) during combustion, thus increasing or decreasing Tfire, and thus Tx.

Figure 4:
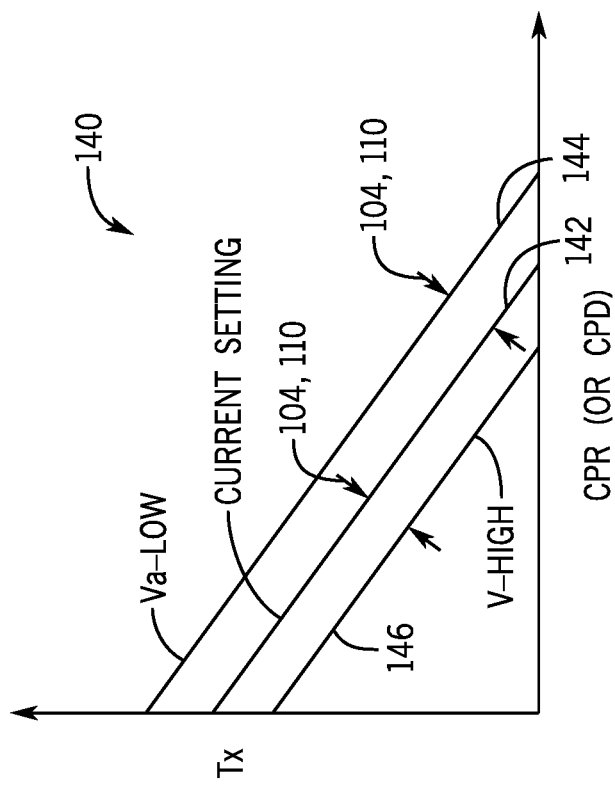
FIG. 4 is a graph of embodiments of a currently in use control curve and adjusted control curves suitable for controlling the power generation system of FIG. 1.

The techniques described herein enable for a dynamic adjustment of the control curve 106 based on vanadium sensed in the HFO 16. Turning now to FIG. 4, the figure illustrates a graph 140 having embodiments of multiple control curve portions, such as portions 142, 144, and 146 (e.g., constant firing temperature portions) that may be adjusted based on sensed vanadium. During operations of the gas turbine engine 12, the controller 50 may sense in real-time vanadium content, vanadium percentage, and/or vanadium concentration of the HFO 16 via sensors 62. The controller may then adjust a currently in use control curve 142 to enable more efficient and/or "cleaner" results when combusting the HFO 16 based on the sensed vanadium content, vanadium percentage, and/or vanadium concentration of the HFO 16.

For example, for lower vanadium content, the currently in use control curve 142 may be adjusted via an adjustment factor 104 and/or 110 to arrive at control curve 144. For higher vanadium content, the currently in use control curve 142 may be adjusted via the adjustment factor 104 and/or 110 to arrive at control curve 146. As mentioned above, the adjustment factors 104 and/or 110 may be found, for example, in a look-up table, and then applied to the currently in use control curve 142. The control curves 142, 144, 146 may then be used to control operations of the gas turbine engine 12. Further, the controller 50 may continually sense vanadium and then apply an adjustment factor, thus resulting in continuous adjustments to control curves.

In certain embodiments, the controller 50 may derive the amount of additive 108 to use before deriving the adjustment factor 104 and/or 110. That is, the controller may sense, via sensors 62, the vanadium content (e.g., the vanadium percentage, the vanadium concentration, and the like) of the HFO 16, and then derive a quantity or flow rate of additive 108 to mix with the HFO 16. In general, it may be desired to add the additive (e.g., magnesium, magnesium-based additive) such that Mg/V=X where Mg is a magnesium content, V is a vanadium content in the HFO 16, and X is between 1 and 5 in weight at any time. Adjustment factors may be similarly derived (e.g., via look-tables) based on vanadium and additive, and the adjustment factors may then be applied to the currently in use control curve 142. By adjusting (e.g., continuously adjusting) the currently in use control curve 142, the techniques described herein may result in less ash deposition in HGP components, improved maintenance, and improved operational life for the gas turbine engine 12.

Figure 5:
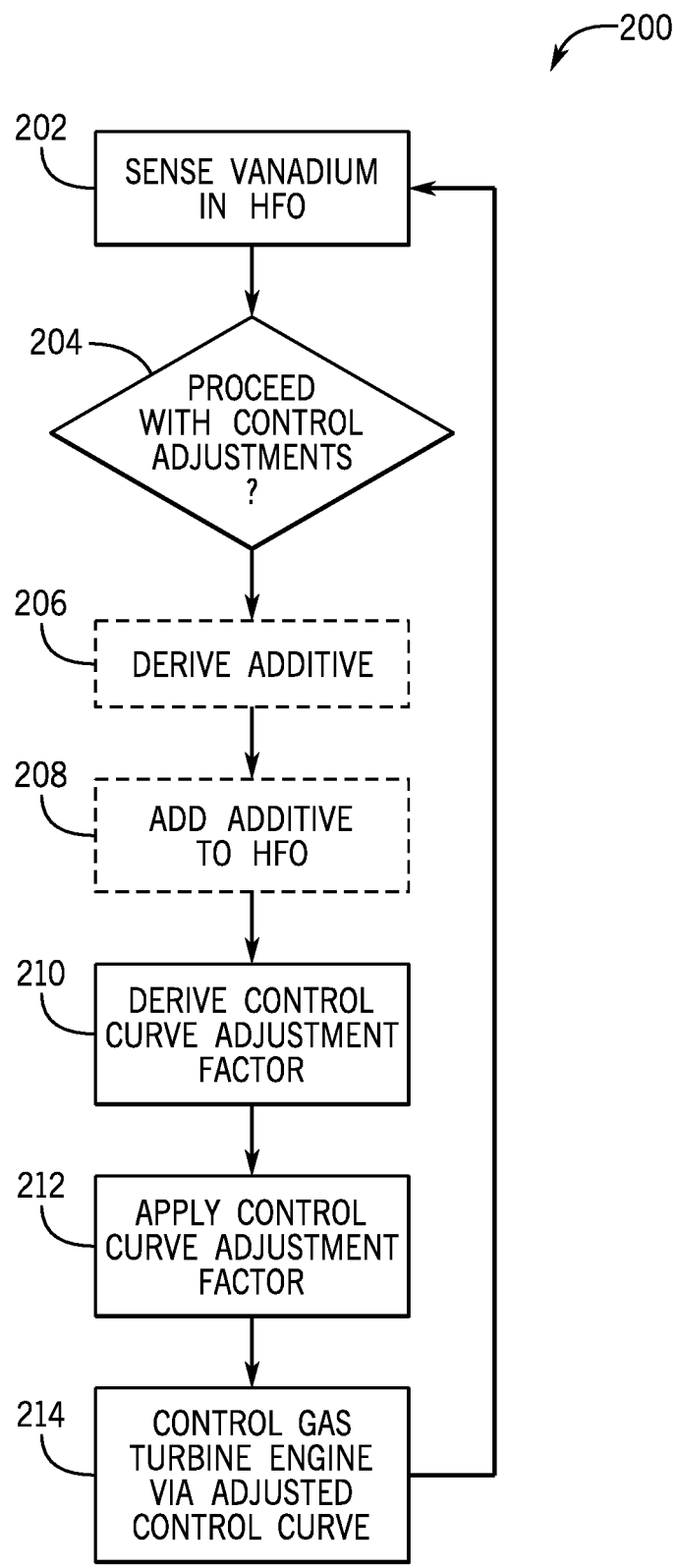
FIG. 5 is a flowchart of an embodiment of a process suitable for sensing vanadium content in a fuel and for controlling operations of the power generation system of FIG. 1 based on the sensed vanadium content.

FIG. 5 is a flowchart illustrating and embodiment of a process 200 suitable for deriving vanadium in the HFO 16 and applying certain control actions based on the derived vanadium. The process 200 may be implemented as computer code or instructions executable by the processor 66 and stored in memory 68. In the depicted embodiment, the process 200 may first derive (block 202), for example in real time, vanadium content in the HFO 16 via sensors 62.

The process 200 may then determine (decision 204) whether to proceed, for example, with certain adjustments (e.g., adjustments 104, 110) to the current control curve 142. More specifically, the process 200 may determine that the vanadium level is low (e.g., below 20 PPM) and thus no further adjustments are derived. In some cases, even if the vanadium level is low (e.g., below 20 PPM), the process 200 may proceed with adjustments because of a previously sensed higher vanadium level. That is once the gas turbine engine 12 has been operating on HFO 16, switching to a cleaner fuel (e.g., vanadium below 20 PPM) may still result in the process 200 derating the gas turbine engine 12 to operate at lower temperatures. By derating the gas turbine engine 12 (e.g., operating at a lower temperature), formation of hard, non-removable ash deposits due to presence of, for example, magnesium in HFO ash (e.g., turbine section 20 and combustion parts such as hot gas path parts) may be reduced or eliminated.

If the process 200 determines (decision 204) to proceed with control adjustments, the process 200 may then derive (block 206) an amount of additive 108 (e.g., magnesium and/or magnesium derivatives) to be added to the HFO 16, and may then add (block 208) the additive to the HFO 16 before combustion via the combustion section 18. It is to be understood that the derivation (block 206) and the addition (block 208) of the additive 108 may not occur if vanadium content is found to be below a certain threshold (e.g., below 20 PPM). It is also to be understood that some embodiments may not include the additive system 65 and thus the derivation (block 206) and the addition (block 208) of the additive 108 may not occur in these embodiments. In certain embodiments, magnesium may be added so that Mg/V=X where Mg is a magnesium content, V is a vanadium content in the HFO 16, and X is between 1 and 5 in weight at any time. Additive 108 may be added, for example, via the additive system 65 via valves, pumps, and so on.

The process 200 may then derive (block 210) the control curve adjustment factors 104 and/or 110 to apply to the currently used control curve 142. As mentioned above, a look up table may be used to derive (block 210) the control curve adjustment factors 104 and/or 110 based on the vanadium content and/or additive 108 in the HFO 16. The process 200 may then apply (block 212) the control curve adjustment factors 104 and/or 110 to the currently used control curve 142, resulting in the adjusted control curve (e.g., 144, 146). The adjusted control curve may then be used to control (block 214) gas turbine engine operations 12. For example, fuel flow and/or oxidant flow (e.g., air) may be increased and/or decreased based on the adjusted control curve. By adjusting the control curve 142 with the adjustment factors 104 and/or 110, the techniques described herein may enable a combustion of the HFO 16 that results in less ash deposition, less loss of performance, and improved maintenance (e.g., less frequent water washes). The process 200 may then iterate back to block 202, thus continuously sensing vanadium, adjusting the currently in use control curve, and dynamically controlling the gas turbine engine.

Technical effects of the present embodiments may include improving gas turbine operations while using HFO. In certain embodiments, a controller may measure, in real-time, vanadium content in the HFO. The controller may then adjust a control curve, for example, by shifting the control curve to lower a firing temperature during combustion of the HFO. The controller may additionally or alternatively derive an amount of additive (e.g., magnesium) to mix with the HFO to ameliorate effects of the vanadium. The amount of additive may additionally be used to calculate the adjustments to the control curve. By adjusting the control curve during combustion of the HFO, the technical effects include improved performance and minimization of maintenance (e.g., offline washes) due to, for example, vanadium ash deposition.

This written description uses examples to disclose the embodiments, including the best mode, and also to enable any person skilled in the art to practice the embodiments, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A control system for a gas turbine system, comprising:
a controller comprising a processor, wherein the processor is configured to:
receive a plurality of signals from sensors disposed in the gas turbine system, wherein the gas turbine system comprises a compressor section fluidly coupled to a gas turbine section;
derive a vanadium content in a gas turbine engine fuel based on at least one of the plurality of signals;
determine if a control curve should be adjusted based on the vanadium content in the gas turbine engine fuel; and
if it is determined that the control curve should be adjusted, then deriving an adjustment to the control curve based on the vanadium content, and applying the adjustment to the control curve to derive an adjusted control curve, wherein the control curve is plotted against a compressor pressure ratio (CPR) ordinate axis and an exhaust temperature abscissa axis.

2. The control system of claim 1, wherein the processor is configured to derive a CPR and a sensed exhaust temperature based on the plurality of signals, and to adjust fuel flow, air flow, or a combination thereof, of the gas turbine system by comparing the sensed exhaust temperature and the CPR to the adjusted control curve.

3. The control system of claim 1, wherein the processor is configured to derive an amount of an additive to add to the gas turbine engine fuel based on the vanadium content.

4. The control system of claim 3, wherein deriving the adjustment to the control curve based on the vanadium content comprises deriving the adjustment to the control curve based on the vanadium content and based on the amount of the additive to add to the gas turbine fuel.

5. The control system of claim 1, wherein the additive comprises magnesium (Mg) and wherein the processor is configured to derive the amount of an additive to add to the gas turbine engine fuel based on the vanadium content Mg/V=X by weight where V comprises vanadium in heavy fuel oil used in operations as the gas turbine engine fuel.

6. The control system of claim 1, wherein the deriving the adjustment to the control curve based on the vanadium content comprises deriving the adjustment so that the adjustment results in a shift of the adjusted control curve when compared to the control curve based on the vanadium content.

7. The control system of claim 6, wherein the processor is configured to increase a downwards shift of the adjusted control curve based on increasing vanadium content, and to increase an upwards shift of the adjusted control curve based on a decreasing vanadium content.

8. The control system of claim 1, wherein the processor is configured to determine if the adjusted control curve should be adjusted based on a second sensed vanadium content, and if it is determined that the adjusted control curve should be adjusted, then deriving a second adjustment and applying the second adjustment to the adjusted control curve to derive a second adjusted control curve.

9. A method, comprising:
receiving a plurality of signals from sensors disposed in a gas turbine system, wherein the gas turbine system comprises a compressor section fluidly coupled to a gas turbine section;
deriving a vanadium content in a gas turbine engine fuel based on at least one of the plurality of signals;
determining if a control curve should be adjusted based on the vanadium content in the gas turbine engine fuel; and
if it is determined that the control curve should be adjusted, then deriving an adjustment to the control curve based on the vanadium content, and applying the adjustment to the control curve to derive an adjusted control curve, wherein the control curve is plotted against a compressor pressure ratio (CPR) ordinate axis and an exhaust temperature abscissa axis.

10. The method of claim 9, comprising deriving an amount of an additive to add to the gas turbine engine fuel based on the vanadium content.

11. The method of claim 10, wherein deriving the adjustment to the control curve based on the vanadium content comprises deriving the adjustment to the control curve based on the vanadium content and based on the amount of the additive to add to the gas turbine fuel.

12. The method of claim 10, wherein the additive comprises magnesium (Mg) and wherein deriving the amount of the additive to add to the gas turbine engine fuel based on the vanadium comprises adding Mg so that Mg/V=X by weight where V comprises vanadium in heavy fuel oil used in operations as the gas turbine engine fuel.

13. The method of claim 9, wherein the deriving the adjustment to the control curve based on the vanadium content comprises deriving the adjustment so that the adjustment results in a shift of the adjusted control curve when compared to the control curve based on the vanadium content.

14. A non-transitory computer-readable medium having computer executable code stored thereon, the computer executable code comprising instructions to:
receive a plurality of signals from sensors disposed in a gas turbine system, wherein the gas turbine system comprises a compressor section fluidly coupled to a gas turbine section;
derive a vanadium content in a gas turbine engine fuel based on at least one of the plurality of signals;
determine if a control curve should be adjusted based on the vanadium content in the gas turbine engine fuel; and
if it is determined that the control curve should be adjusted, then deriving an adjustment to the control curve based on the vanadium content, and applying the adjustment to the control curve to derive an adjusted control curve, wherein the control curve is plotted against a compressor pressure ratio (CPR) ordinate axis and an exhaust temperature abscissa axis.

15. The non-transitory computer-readable medium of claim 14, wherein the computer executable code comprises instructions to derive an amount of an additive to add to the gas turbine engine fuel based on the vanadium content.

16. The non-transitory computer-readable medium of claim 14, wherein the instructions to derive the adjustment to the control curve based on the vanadium content comprise instructions to derive the adjustment to the control curve based on the vanadium content and based on the amount of the additive to add to the gas turbine fuel.

17. The non-transitory computer-readable medium of claim 14, wherein the instructions to derive the adjustment to the control curve based on the vanadium content comprise instructions to derive the adjustment so that the adjustment results in a shift of the adjusted control curve when compared to the control curve based on the vanadium content.

* * * * *